(12) United States Patent
Scholl

(10) Patent No.: US 6,277,902 B1
(45) Date of Patent: *Aug. 21, 2001

(54) MIXTURES OF RUBBERS AND ACTIVATED AND HYDROPHOBIC OXIDIC AND SILICEOUS FILLERS AND A PROCESS FOR THEIR PREPARATION

(75) Inventor: Thomas Scholl, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/293,695

(22) Filed: Apr. 16, 1999

(30) Foreign Application Priority Data

Apr. 24, 1998 (DE) ................................ 198 18 552

(51) Int. Cl.[7] ................ C08J 3/00; C08K 9/06; C08L 81/00; C08L 85/00; B60C 5/00
(52) U.S. Cl. .............. 523/213; 152/450; 152/905; 524/609; 524/881; 524/858; 524/791; 524/790; 524/783; 524/779; 524/788; 524/837; 528/10; 528/25; 528/26; 528/27; 528/42
(58) Field of Search ............. 523/213; 524/609, 524/881, 858, 791, 790, 783, 779, 788, 837; 528/10, 25, 26, 27, 42; 152/450, 905

(56) References Cited

U.S. PATENT DOCUMENTS

| 5,166,227 | 11/1992 | Raines et al. | 523/342 |
| 5,780,531 | 7/1998 | Scholl | 523/213 |
| 5,834,536 | 11/1998 | Scholl | 523/211 |
| 5,896,904 | 4/1999 | Ozaki et al. | 152/209 R |

FOREIGN PATENT DOCUMENTS

| 721 971 | 7/1996 | (EP) . |
| 761742 | * 12/1997 | (EP) . |
| 98/53004 | 11/1998 | (WO) . |

OTHER PUBLICATIONS

J. Schnetger: "Lexikon der Kautschuktecjnik" 1991, Hüthig Buch Verlag, Heidelbert, XP002110690 *Verstärkungsadditive* *Seite 714—Seite 716*.

* cited by examiner

*Primary Examiner*—Patrick D. Niland
(74) *Attorney, Agent, or Firm*—Joseph C. Gil; Noland J. Cheung

(57) ABSTRACT

The present invention relates to rubber compounds comprising one or more soluble rubbers, hydrophobized filler, and one or more sulfane-silane compounds on an inorganic or organic support and to a process for making them. The novel rubber compounds are suitable for moldings of every kind, especially tires or tire treads having low rolling resistance and high resistance to abrasion.

18 Claims, No Drawings

MIXTURES OF RUBBERS AND ACTIVATED AND HYDROPHOBIC OXIDIC AND SILICEOUS FILLERS AND A PROCESS FOR THEIR PREPARATION

FIELD OF THE INVENTION

The present invention relates to rubber mixtures containing one or more soluble rubbers, hydrophobic fillers and one or more polysulfidic silanes applied on inorganic and/or organic supports, and a process for their preparation. Rubber mixtures according to the present invention are suitable for producing molded bodies of all types; in particular for producing tires and tire treads which have a low rolling resistance and a high resistance to abrasion.

BACKGROUND OF THE INVENTION

The production of silica-filled rubber mixtures, as compared with carbon black-filled rubber mixtures, requires a more protracted mixing process. The higher mixing requirement when incorporating silica, however, could, in principle, be avoided if the silica were incorporated into a rubber solution immediately after producing the rubber. The precipitated silicas currently used for producing tires, however, are not suitable for this type of process without some pretreatment since they are not precipitated when removing the solvent with steam, but largely remain in the water phase.

U.S. Pat. No. 5,166,227 describes a process for producing silica-filled emulsion rubber mixtures in which a dispersion of silica and a rubber latex are spray dried together. This process has the disadvantage that the entire amount of water has to be evaporated involving a high energy demand. In addition, the silica is not activated in contrast to the rubber mixtures in the present invention.

Polysulfidic silanes applied to supports and prepared by reacting halogenosilanes with polysulfides in the presence of a support in water are described in EP-761,742, wherein it is mentioned that these materials can also be used in the non-dried state for preparing rubber/filler master batches. It has now been found, as a new feature, that special requirements have to be placed on the fillers for preparing rubber/silica master batches which are not mentioned or suggested in EP-761,742.

DETAILED DESCRIPTION OF THE INVENTION

It has now been found that polysulfidic silanes applied to supports, can be worked up with rubber solutions and special hydrophobic oxidic and/or siliceous fillers, without any loss of filler occurring in the effluent water and that the rubber mixtures obtained in this manner exhibit better processing behavior such as e.g. more extended processing times and lower viscosities. The molded bodies prepared therefrom, surprisingly, have improved dynamic damping properties and improved abrasion behavior. Rubber mixtures according to the present invention are therefore, particularly suitable for producing tires and tire treads with a low rolling resistance and a high resistance to abrasion.

Therefore, the present invention provides rubber mixtures containing one or more soluble rubbers, 5 to 500 parts by weight of hydrophobic filler and 0.1 to 40 parts by weight of one or more polysulfidic silanes applied on inorganic and/or organic supports, wherein the parts by weight cited are each with reference to 100 parts by weight of rubber (phr).

The polysulfidic silanes applied to inorganic and/or organic supports are prepared in accordance with EP-761, 742 by reacting halogenoalkylsilanes (I) and optionally organic halogenated compounds (II), with polysulfides (III) in water in the presence of an organic and/or inorganic support, with a polysulfidic silane to support weight ratio of 0.1 to 10, at temperatures of 20 to 220° C., wherein the molar ratio of components (I):(II):(III) depends on the number of bonded halogen atoms and is in the range from 1.5 to 3 moles of bonded halogen per mole of polysulfide. The polysulfidic silanes are preferably used as an aqueous suspension.

The halogenoalkylsilanes (I), organic halogenated compounds (II) and polysulfides (III) to be used correspond to the formulae $R^1R^2R^3Si-X-(Hal)_n$ (I)

$Y-(Hal)_m$ (II)

$Me_2S_x$ (III)

in which $R^1, R^2, R^3$ are identical or different and represent chlorine, a $C_1$–$C_{18}$-alkyl or $C_1$–$C_{18}$-alkoxy group, which may optionally be interrupted by oxygen, nitrogen or sulphur atoms, or a $C_6$–$C_{12}$-aryl, $C_6$–$C_{12}$-aryloxyoxy, $C_7$–$C_{18}$-alkylaryl or alkylaryloxy group, with the proviso that at least one of the groups $R^1$ to $R^3$ is an alkoxy, aryloxy or alkylaryloxy group or a chlorine atom, X represents linear, branched or cyclic, optionally unsaturated $C_1$–$C_{18}$-alkylene groups, which may optionally be interrupted by oxygen atoms, and wherein one to three hydrogen atoms might be substituted by halogen atoms.

Y represents a monovalent to tetravalent linear, branched, optionally unsaturated or aromatic $C_1$–$C_{36}$ hydrocarbon group, which may optionally be substituted with $C_6$–$C_{12}$-aryl, $C_1$–$C_{12}$-alkoxy, hydroxy, cyano, amido, $C_1$–$C_{22}$—COO or $C_1$–$C_{22}$—OOC groups, carboxylic acid or sulfonic acid groups and their salts and optionally may be interrupted by oxygen, nitrogen or sulfur atoms or may represent a mono to trivalent heteroaryl group, m is an integer from 1 to 4, n is an integer from 1 to 3, x is an integer from 1 to 8, Hal represents fluorine, chlorine or bromine and Me represents ammonium or a metal atom.

Preferred halogenosilanes (I) are e.g. 1-chloromethyl-trimethoxysilane, 1-chloro-methyltriethoxysilane, 1-chloromethyltributoxy-silane, 1-chloromethyltri(ethoxyethoxy)silane, 1-chloromethylmethyl-methoxysilane, 1-chloromethylmethyl-diethoxysilane, 1-chloromethylmethoxy-dibutoxysilane, 1-chloromethyidimethyl-methoxysilane, 1-chloromethyldimethylethoxysilane, 1-chloromethyidimethylbutoxysilane, 3-chloro-propyltrimethoxysilane, 3-chloropropyltriethoxysilane, 3-chloropropyltripropoxysilane, 3-chloropropyltributoxysilane, 3-chloropropylpentoxysilane, 3-chloropropyltrihexoxysilane, 3-chloropropyltrioctoxysilane, 3-chloropropyltriphenoxysilane, 3-chloropropylmethyldimethoxysilane, 3-chloropropylmethyl diethoxysilane, 3-chloropropylmethyldibutoxysilane, 3-chloropropyldimethylmethoxysilane, 3-chloropropyldimethylethoxysilane, 3-chloropropyl-diethylphenoxysilane. 1-chloro-methylmethyidiethoxysilane and 3-chloropropyl-triethoxysilane are particularly preferred.

Preferred organic halogenated compounds (II) are e.g. alkyl monohalides, such as methyl chloride, ethyl chloride, propyl chloride, butyl chloride, hexyl chloride, octyl chloride, decyl chloride, dodecyl chloride, octadecyl chloride, benzyl chloride, chloroethanol, chloropropanol, chloroacetic acid and its alkali metal salts, chloropropionic acid and its alkali metal salts, and alkylene dihalides in which Y represents methylene, ethylene, propylene, 2-hydroxypropylene, butylene, hexylene, cyclohexylene, octylene, decylene, dodecylene, 2,2-oxydiethylene, methylene-bis-oxyethylene, ethylene-bis-oxyethylene, 2,2-thiodiethylene, N-methyl-N,N-diethylene or xylidene groups. 1,2-dichloroethane, 1,6-dichlorohexane, bis-(2-chloroethyl) formal and 1,2,3-trichloropropane are particularly preferred. Organic halogenated compounds (II) may be used individually or as a mixture.

Preferred molar ratios of halogenoalkylsilanes (I) to other organic halogenated compounds (II) are between 1:0 and 1:100. Particularly preferred ratios are between 1:0 and 1:30.

Preferred polysulfides (III) are those in which Me represents ammonium, lithium, sodium or potassium.

Water is used as the reaction medium for preparing the polysulfidic silanes which are applied to an inorganic and/or organic support. In addition, mixtures of water with organic solvents may also be used such as e.g. methanol, ethanol, n-propanol, i-propanol, i-butanol, amyl alcohol, hexyl alcohol, n-octanol, i-octanol, ethylene glycol, 1,2- and 1,3-propylene glycol, 1,4-butanediol, 1,6-hexanediol and mixtures with aromatic, aliphatic or cycloaliphatic hydrocarbons such as e.g. toluene, cyclohexane, hexane, octane or open chain or cyclic ethers such as e.g. diethyl ether, dibutyl ether, tetrahydrofuran and 1,3-dioxolan.

Particularly suitable organic and inorganic support materials for the polysulfidic silanes applied to inorganic and/or organic supports are e.g.: Carbon blacks which have been prepared by the flame black, furnace black or channel black method and which have BET surface areas of 1 to 200 m²/g, such as e.g. SAF, ISAF, IISAF, HAF, FEF or GPF carbon blacks. Furthermore, highly dispersed silicas prepared e.g. by precipitation of solutions of silicates or by flame hydrolysis of silicon halides with specific surface areas of 5 to 1000, preferably 10 to 400 m²/g (BET surface area) and with primary particle sizes of 5 to 400 nm. The silicas may optionally also be present as mixed oxides with other metal oxides such as Al, Mg, Ca, Ba, Zn and Ti oxides. Synthetic silicates such as aluminum silicate, alkaline earth silicates such as magnesium silicate or calcium silicate with BET surface areas of 5 to 400 m²/g and primary particle diameters of 10 to 400 nm. Naturally occurring silicates such as kaolin and other naturally occurring silicas, metal oxides such as zinc oxide, calcium oxide, magnesium oxide, aluminum oxide, metal carbonates such as magnesium carbonate, calcium carbonate, zinc carbonate, metal sulfates, such as calcium sulfate, barium sulfate, metal hydroxides such as aluminum hydroxide, magnesium hydroxide, glass fibers and glass fiber products or microglass beads and rubber gels with primary particle sizes of 1 to 2000 nm. The support materials mentioned may be used individually or as a mixture.

The polysulfidic silanes applied to organic or inorganic supports or mixtures of them have polysulfidic silane to support weight ratios of 0.1 to 10, preferably 0.2 to 5 (in the dry and salt-free state). The weight ratio of polysulfidic silane to support is determined by filtration and subsequent drying of the reaction product at 105° C. The weight ratio is determined according to the formula:

$$\text{weight ratio of polysulfidic silane to support} = (\text{weight of filtered and dried Product} - \text{weight of support})/\text{weight of support}$$

The silanes are preferably further processed in the water-moist condition after preparation, without drying, but they may also be dewatered by conventional methods such as spray drying, spin flash drying, in a rotary tubular furnace or using a conveyor dryer under normal pressure or under a vacuum at temperatures from room temperature to about 250° C.

The molar ratio of components (I): (II): (III) depends on the number of bonded halogen atoms in the starting compounds (I) and (II) and is 1.5 to 3 moles of reactive (mono)halide per mole of polysulfide (III). It is ideally selected so that two moles of (mono)halide are reacted per mole of polysulfide. The molar ratios mentioned herein refer to monohalogenated compounds. When using polyhalogenated compounds, the ratio of polysulfide to polyhalogen compound must be adjusted accordingly. The molar ratios mentioned are valid only for halogen compounds which react with polysulfides in aqueous solution.

If halogenoalkylsilanes (I) are used in which one or more of the groups $R^1$ to $R^3$ represent a chlorine atom, then the addition of a base is recommended, such as e.g. NaOH, KOH, $Ca(OH)_2$, $Na_2CO_3$ or $K_2CO_3$, in order to neutralize the hydrochloric acid being released.

The reaction temperatures may be 0 to 200° C. and the process may be performed under pressure. The reaction times are between a few minutes and up to 48 hours. Following reaction, the reaction product may be filtered off, water-soluble metal halides can be removed by washing and the product is dried. In a particularly preferred embodiment, the reaction product is not filtered off and not dried but is mixed, in the crude form produced, into the mixture of rubber solution and hydrophobic filler in order to prepare the rubber mixtures.

The expression hydrophobic fillers is understood to cover fillers which are not wetted by water in the dry state (loss on drying according to DIN ISO 787/2 at 105° C. less than 1 wt.%) at room temperature. Preferred hydrophobic fillers in the dry state have a methanol wettability of 1 to 60 wt. %, preferably 5 to 50 wt. %. The methanol wettability cited is the minimum concentration (in wt. %) of methanol in a methanol/water mixture which is able to wet the filler.

The methanol wettability is determined as follows: 200 mg of the silica and 50 ml of water are placed in a 250 ml round-bottomed flask with a magnetic stirrer. The (partially) hydrophobic silica remains on the surface of the water. Then the tip of a graduated pipette full of methanol is immersed into the liquid phase (avoiding direct contact with the silica) and the methanol is allowed to flow out slowly. The mixture is stirred with the magnetic stirrer so that a vortex is produced in the liquid. Methanol is added until the solid substance is wetted. This is the case when the silica is no longer distributed over the entire surface of the liquid phase (which now contains methanol) and the relatively clear film-free liquid becomes visible.

Evaluation: the data on methanol wettability are given in wt. % of methanol in the methanol/water mixture according to the formula Methanol wettability (in wt. %)=(0.79×No. of ml of MeOH/0.79× No. of ml of MeOH+50)×100.

Many methods, which are appropriate for hydrophobizing oxidic and siliceous fillers, are described in the literature, such as e.g. the treatment of precipitated silicas and silicates with inorganic and organic fluorides such as those described in U.S. Pat. Nos. 2,477,695 and 2,625,492, or the preparation or post-treatment of precipitated silicas by neutralizing silicate solutions with organohalogenosilanes such e.g. dimethyidichlorosilane (DE-AS 1,229,504). Another method for hydrophobizing in aqueous dispersion is the post-treatment of precipitated silicas with organosilanes (EP-849,320, U.S. Pat. No. 5,763,388) and alkylaminosilanes such as e.g. 3-(octa-decenylamino)propyltriethoxysilane or N-Oleyl-N-(3-trimethoxisilyl)propyl-ammoniumchloride (WO-98/53004) in water.

The hydrophobizing process may take place in aqueous suspension, in an organic solvent or in the dry state. Hydrophobization is preferably performed in aqueous medium or solvent free. Especially preferred is the hydrophobization in aqueous medium with alkyl-aminosilanes, preferably 3-(Octadecenylamino)-propyltriethoxysilane or N-Oleyl-N-(3-trimethoxysilyl)propyl-amoniumchloride according to the process taught in WO-98/53005. The hydrophobic fillers may be used in the dry form, as an aqueous dispersion or a dispersion in an organic solvent.

Particularly suitable hydrophobic fillers are those which are produced from oxidic and/or siliceous fillers (A) to which have been added before, during or after a drying procedure, 0.5 to 200, preferably 1 to 50 parts by weight, with respect to 100 parts by weight of filler, of a water-insoluble organic compound or (B) which have been reacted before, during or after a drying procedure with partial or complete reaction of the silanol groups with 0.5 to 200, preferably 1 to 50 parts by weight, with respect to 100 parts by weight of filler, with a hydroxyl group-containing compound or (C) which have been reacted before, during or after a drying procedure with partial or complete reaction of the silanol groups with 0.1 to 50, preferably 0.1 to 10 parts by weight, with respect to 100 parts by weight of filler, with a reactive silicon compound.

Oxidic and/or siliceous fillers are understood to be any known naturally occurring or synthetic fillers of the appropriate type. These are for example: precipitated or pyrogenic silicas, aluminum hydroxide, aluminum silicate, calcium silicate, calcium sulfate, china clay and calcined clay.

The following are particularly preferred:

highly dispersed silicas prepared e.g. by precipitating from solutions of silicates or by the flame hydrolysis of silicates, from silicon halides with specific surface areas of 5–1000, preferably 20 to 400 m$^2$/g (BET surface area) and with primary particle sizes of 10–400 nm. The silicas may be present as mixed oxides with other metal oxides such as Al, Mg, Ca, Ba, Zn, Zr, Ti oxides.

synthetic silicates such as aluminum silicate, alkaline-earth silicates such as magnesium silicate or calcium silicate with BET surface areas of 20–400 m$^2$/g and primary particle diameters of 10 to 400 nm.

naturally occurring silicates such as kaolin and other naturally occurring silicas.

glass fibers and glass fiber products (matts, ropes) or microglass beads metal oxides, such as zinc oxide, calcium oxide, magnesium oxide, aluminum oxide metal carbonates, such as magnesium carbonate, calcium carbonate, zinc carbonate metal hydroxides, such as aluminum hydroxide, magnesium hydroxide.

The hydrophobic fillers to be used according to the present invention may be prepared by methods (A) in which the siliceous and/or oxidic filler is mixed with a water-insoluble organic compound before, during or after a drying process in which the water content is preferably lowered to less than 3 wt. %, in particular less than 1 wt. %. The water content of the filler is understood to include any physically bonded water which can be removed at a drying temperature of 105° C. (DIN ISO 787/2). Suitable water-insoluble compounds are e.g. unsaturated and saturated fatty acids and waxes, as described in DE-OS 2,419,759, synthetic plasticizers such as dioctylphthalate, adipates, modified fatty acids such as dimerized and oligomerized fatty acids, natural unsaturated oils such as olive oil, rape seed oil, castor oil, sunflower seed oil, cotton seed oil, linseed oil, peanut oil, their oligomerization products and the corresponding unsaturated and hydrogenated fatty acids and their transesterification products with mono to hexahydric $C_1$–$C_{22}$ alcohols such as naphthenic, paraffinic and aromatic mineral oils, water-insoluble alcohols such as e.g. octanol, dodecanol, stearyl alcohol, undecenyl alcohol and oleyl alcohol, synthetic oils such as lubricating oils based on polyesters or polyethers, silicone oils such as e.g. polydimethylsiloxanes, sulfur and dialkyl-polysulfides such as e.g. dioctylpolysulfide, adducts of sulfur with unsaturated oils and unsaturated fatty acid esters such as e.g. the reaction products of sulfur and oleyl alcohol, olive oil, rape seed oil or castor oil, low molecular weight rubbers, in particular polybutadiene oil, low molecular weight butadiene/acrylonitrile copolymers, polyisobutylene, liquid natural rubber. In addition, high molecular weight rubbers such as natural rubber, butadiene rubber, styrene/butadiene rubber, acrylonitrile/butadiene rubber and thermoplastic compounds may be used in combination with solvents or in the latex form. The molecular weights are preferably between 150 and 10,000.

Particularly preferred compounds are natural unsaturated oils such as olive oil, rape seed oil, castor oil, sunflower seed oil, cotton seed oil, linseed oil, peanut oil, their oligomerization, transesterification and hydrogenation products and the corresponding unsaturated and hydrogenated fatty acids and their esterification products with mono to hexavalent $C_1$ to $C_{30}$ alcohols. The compounds may be used individually or as a mixture.

The compounds may be applied in bulk, in solution or as a latex to the siliceous or oxidic filler. They are preferably applied solvent-free or as an aqueous dispersion. The siliceous and/or oxidic filler itself may be used as an aqueous dispersion or as water-moist filter cakes or in the dried form. One method of applying the waxes and thermoplastic compounds to be used, from an aqueous dispersion, during or directly after the precipitation process when producing precipitated silicas is described for example in U.S. Pat. No. 3,607,337. Drying may be performed, for example, by spray drying, in a rotary kiln or using a moving-band dryer.

The hydrophobic fillers to be used according to the invention may also be prepared by methods (B) in which the siliceous and/or oxidic filler is reacted with a hydroxyl group-containing compound before, during or after a drying process in which the water content is lowered to less 3 wt. %, preferably less than 1 wt. %. Preferred hydroxyl group-containing compounds are octanol, 1-decanol, undecenyl alcohol, dodecanol, dodecenyl alcohol, hexadecanol, hexadecenol, octadecanol, behenyl alcohol, oleyl alcohol, ricinoleic acid, cinnamyl alcohol, castor oil, hydroxyethyl (meth)acrylate, 4-hydroxybutyl(meth)acrylate, hydroxyl group-containing polybutadiene oil with preferably OH values of 20 to 200 (Poly BD resins from Elf Atochem or Hycar HT from BF Goodrich), hydroxy group-containing unsaturated polyesters with average molecular weights of 1,000 to 20,000, hydroxyl group-containing hydrophobic polyethers, such as e.g. addition products with 1 to 200 moles of propylene oxide per mole of alcohol. Particularly preferred alcohols are $C_8$–$C_{36}$-alkyl monoalcohols and $C_5$–$C_{36}$-alkyl polyols, in particular n- and isooctyl alcohol, nonanol, decanol, dodecanol, octadecyl alcohol, octadecenyl alcohol, neopentyl glycol and trimethylolpropane.

The compounds may be used individually or as a mixture or also as a mixture with the compounds which can be prepared by method (A) which are then optionally bonded to the filler only by physical means.

Reaction of the fillers with the hydroxyl group-containing compounds may be performed in bulk or in organic solvents or under vacuum at temperatures from above room temperature (20° C.) to below the decomposition temperature of the hydroxyl group-containing compounds.

In order to perform esterification at temperatures below 100° C., it is recommended that the oxidic or siliceous filler be given a previous thermal treatment at temperatures of 300 to 800° C., as is described in U.S. Pat. No. 2,736,669. Otherwise temperatures from 100° C. to below the decomposition temperature of the hydroxyl group-containing compound are preferred. The oxidic and/or siliceous fillers may also be used as a water-moist product or even as a slurry in water. The residual moisture is removed from the reaction product with the water formed during reaction. The reaction water is advantageously removed carefully during reaction or in a subsequent drying step. Completion of esterification can be detected for example in that, when using suitable solvents, the hydroxyl group-containing compound can no longer be extracted.

Suitable solvents for performing the surface reaction with the compounds are, for example, saturated or unsaturated, aliphatic or aromatic hydrocarbons, chlorinated aliphatic or chlorinated aromatic hydrocarbons and alcohols.

The hydrophobic fillers to be used according to the present invention may be prepared by methods (C) in which the siliceous and/or oxidic filler is reacted with a silicon compound which can react with SiOH groups in the filler before, during or after a drying process in which the water content is preferably lowered to less 3 wt. %, in particular less than 1 wt. %.

The silicon compounds to be used in this case are alkoxysilanes such as e.g. tetramethoxy- and tetraethoxysilane, alkylalkoxysilanes such as octyltrimethoxy- and octyltriethoxysilane, octadecyltriethoxysilane, dimethyidiethoxysilane, trimethylethoxysilane, polydimethylsiloxanes with reactive SiOH groups and with reactive alkoxysilylether groups such as e.g. methoxy and ethoxy groups, cyclic dimethylsiloxane ethers, such as octamethylcyclotetrasiloxane, trimethylsilylamines such as hexamethyl-disilazane or sulfur-containing silylethers, in particular bis(trialkoxy-silylalkyl)polysulfides as are described in DE 2,141,159 and DE-AS 2,255,577, oligomeric and/or polymeric sulfur-containing silyl ethers from DE-OS 4,435,311 and EP-A 670,347, mercaptoalkyltrialkoxysilanes, in particular mercaptopropyltriethoxysilane, thiocyanatoalkylsilylethers, such as described e.g. in DE-OS 19,544,469. $C_6$–$C_{18}$-alkylalkoxysilanes, polydimethylsiloxanes with reactive SiOH groups and cyclic dimethyl-siloxaneethers such as octamethylcyclotetrasiloxane etc are quite particularly preferred. The amount of silicon compound to be used is governed by its effectiveness and can readily be determined in preliminary trials. It is between 0.1 and 50 parts by weight, preferably 0.1 and 10 parts by weight, in particular between 0.1 and 5 parts by weight, with respect to 100 parts by weight of oxidic and/or siliceous filler.

The reaction temperatures for this process are between room temperature and the decomposition temperature of the silicon compound. The reaction may optionally be accelerated by acid or alkaline catalysts. Ammonia or sodium alcoholate, for example, may be used for this purpose.

Furthermore, the invention also provides a process for preparing the rubber mixtures according to the present invention which is characterized in that 0.1 to 40 parts by weight of polysulfidic silanes immobilized on inorganic and/or organic, with a silane to support ratio of 0.1 to 10, is mixed with a rubber solution which, may optionally, contain other auxiliary substances for working up, processing and stabilizing and additional fillers, and 5 to 500 parts by weight of hydrophobic filler and the solvent and water are removed at temperatures of 50 to 250° C. The parts by weight mentioned herein each refer to 100 parts by weight of rubber (phr).

The process according to the present invention is performed in such a way that 5 to 500 parts by weight (with respect to 100 parts by weight of rubber) of a hydrophobic preferably oxidic and/or siliceous filler and 0.1 to 40 parts by weight of a polysulfidic silane on a support material are added as a suspension to a rubber solution and then the solvent is removed at temperatures of 50 to 200° C., optionally under vacuum or under a pressure of 0 to 10 atmospheres. The solvent is preferably removed using steam distillation. The hydrophobic fillers may be used in the dry form, as an aqueous dispersion or as a dispersion in organic solvents. Further auxiliary substances for working up, processing and stabilizing and other fillers, such as e.g. anti-foaming agents, plasticizers, anti-oxidants, carbon blacks, rubber gels, non-hydrophobic oxidic or siliceous fillers, etc may also be contained in the mixture of rubber, solvent, silane and filler.

Rubbers, which are suitable for preparing the rubber solutions for the process according to the present invention, are soluble, natural rubbers and synthetic rubbers. Preferred synthetic rubbers are, for example, described in W. Hofmann, Kautschuktechnologie, Gentner Verlag, Stuttgart 1980. They include, inter alia, BR—polybutadiene
ABR—$C_1$–$C_4$-alkyl acrylate/butadiene copolymers
CR—polychloroprene
IR—polyisoprene
SBR—styrenelbutadiene polymers with a styrene content of 1–60, preferably 20–50wt. %
IIR—isobutylenelisoprene copolymers
NBR—butadiene/acrylonitrile copolymers with an acrylonitrile content of 5–60, preferably 10–40 wt. %
HNBR—partly hydrogenated or fully hydrogenated NBR rubber
EPDM—ethylene/propylene/diene copolymers and mixtures of these rubbers. For preparing vehicle tires when using the polysulfidic silanes immobilized on inorganic and/or organic supports and the hydrophobic fillers, natural rubber, synthetic polyisoprene, emulsion SBR and solution SBR rubbers with a glass transition temperature above −50° C., which may optionally be modified with silylethers or other functional groups such as described e.g. in EP-A 447,066, polybutadiene rubber with a high 1,4-cis content (>90 %), which has been prepared with catalysts based on Ni, Co, Ti or Nd and polybutadiene rubber with a vinyl content of 0–75% and their mixtures are of particular interest.

The dissolved rubber, in a particularly preferred embodiment of the process according to the invention, may be coagulated in water during removal of the solvent, for example by dropwise addition of the rubber solution to hot water or by mutual atomization of the rubber solution with steam and precipitating in water.

Suitable solvents for dissolving the rubbers, which can be used according to the invention, are, in particular, aliphatic, cycloaliphatic and aromatic solvents. Hydrocarbons with 2 to 12 carbon atoms are particularly preferred, such as n-butane, iso-butane, n- and iso-pentane, hexane, cyclohexane, propene, 1-butene, trans 2-butene, 1-pentene, 2-pentene, 1-hexene, 2-hexene, benzene, toluene, xylene, ethylbenzene. The solvents may be used individually or as a mixture.

The concentration of rubber in the solution is 0.5 to 50 wt. % and is mainly limited by the viscosity of the solution. The concentration of rubber should be as high as possible for economic reasons. Particularly preferred concentrations are within the range from 5 to 35 wt. % of rubber.

Particularly preferred concentrations of hydrophobic filler are 20 to 125 parts by weight per 100 parts by weight of rubber.

To improve the flow properties it is recommended that a plasticizer also be added, in particular a paraffinic, naphthenic or aromatic plasticizer in quantities of 1 to 100 parts by weight, with respect to 100 parts by weight of rubber. Aromatic plasticizers in quantities of 5 to 75 parts by weight are particularly preferred.

The process according to the present invention is quite particularly advantageous for preparing pale-colored, filled solution SBR, solution polybutadiene and solution polyisoprene mixtures since these can be further processed in the same solvent following production, and exhibit particularly good tire engineering characteristics.

The invention also provides use of the rubber mixtures according to the invention for preparing molded bodies of all types.

Molded bodies in the context of the invention are e.g. cable sheathing, hoses, drive belts, conveyor belts, coatings for rollers, tires, soles of shoes, sealing rings and damping elements and are quite particularly preferably low rolling resistance tire treads.

To prepare molded bodies from the rubber mixtures according to the invention (master batches), other rubbers, in accordance with those mentioned above, and auxiliary rubber products may also be admixed, in particular, other diene rubbers, reaction accelerators, anti-aging agents, thermal stabilizers, light protective agents, ozone protective agents, processing auxiliary substances, plasticizers, tackifiers, blowing agents, colorants, pigments, waxes, stretching agents, organic acids, retardants; metal oxides and activators such as triethanolamine, polyethylene glycol, hexanetriol, trimethylolpropane, or sulfur-containing silyl ethers which are known in the rubber industry. Other fillers may also be added to the rubber mixtures. These may be the hydrophobic and non-hydrophobic oxidic and/or siliceous fillers in accordance with those mentioned above and also rubber gels and/or carbon blacks. The carbon blacks used in this case may be prepared by the lamp black, furnace black or channel black process and have BET surface areas of 20 to 200 $m^2/g$ such as e.g. SAF, ISAF, HAF, FEF or GPF carbon blacks.

The auxiliary rubber agents are used in conventional amounts which depend, inter alia, on the ultimate purpose. Conventional amounts are e.g. amounts of 0.1 to 50 wt. % with respect to the total amount of rubber.

Sulfur, sulfur donors or peroxides may be used as cross-linking agents when preparing the molded bodies. Rubber mixtures according to the invention may also contain vulcanization accelerators. Examples of suitable vulcanization accelerators are mercaptobenzthiazoles, guanidines, thiurams, dithiocarbamates, thioureas and thiocarbonates.

The cross-linking accelerators and sulfur or peroxides are used in amounts of 0.1 to 10 wt. %, preferably 0.1 to 5 wt. %, with respect to the total amount of rubber.

The admixture of optionally other rubbers and auxiliary rubber agents to rubber mixtures according to the invention may be performed in conventional mixing units such as rollers, intimate mixers and mixer extruders.

Vulcanization may be performed at temperatures of 100 to 200° C., preferably 130 to 180° C., optionally under a pressure of 10 to 200 bar.

The invention is further illustrated but is not intended to be limited by the following examples in which all parts and percentages are by weight unless otherwise specified.

EXAMPLES

Example 1a: Silica hydrophobized by treatment with castor oil

Vulkasil® S (550 g)—a highly active precipitated silica with a BET surface area of 180 $m^2/g$, made by Bayer AG—and castor oil (27.5 g) were placed in a three-necked flask fitted with a stirrer and recovery bend. The flask was immersed in an oil bath at 220° C. for 4 h, and its contents were stirred continuously. The product remaining (546 g) after water had been driven off in this way was a white powder, which, unlike the untreated silica, was wettable by methanol to the extent of 15 wt.-% but not wetted by water.

Example 1b: A polysulfidic-silane compound on silica

Sodium sulfide trihydrate (9.81 g, 74 mmol $Na_2S.3H_2O$) and sulfur (7.13 g, 223 mmol) were dissolved in water (200 ml) at 70° C., and Vulkasil C (40 g)—an active precipitated silica with a BET surface area of 50 $m^2/g$, made by Bayer AG—was stirred in. The mixture was then stirred with (3-chloropropyl)triethoxysilane (35.83 g, 149 mmol) for 8 h at 85° C. The product was a viscous, yellowish suspension, containing 40 g of the polysulfane-silane compound* on 40 g of silica, which was used without further treatment for the preparation of rubber compounds. After the suspended solid had been filtered off and dried at 105° C. it had a polysulfidic-silane compound to silica carrier mass ratio of 0.9.

*Tetrasulfanediylbis(propane-1,3-diyl)bis(triethoxysilane), $(C_2H_5O)_3Si\text{-}[CH_2]_3\text{-}[S]_4\text{-}[CH_2]_3\text{-}Si(OC_2H_5)_3$.

Example 1c: A styrene-butadiene rubber compound

| Composition | phr |
|---|---|
| Buna ® VSL 5025-0 | 100 |
| Vulkanox ® BKF (phenolic antioxidant-Bayer AG) | 0.5 |
| Renopal ® 450 (mineral oil high in aromatics-Fuchs Mineralölwerke) | 37.5 |
| Hydrophobized silica prepared as in Example 1a | 92 |
| A polysulfidic-silane compound on silica as in Example 1b | 16 |

Preparation

Buna VSL 5025-0 (500 g)—solvent-polymerized high-vinyl styrene-butadiene rubber with a mass fraction of bound styrene of 25% and a mass fraction vinyl groups of 50%, made by Bayer AG—and Vulkanox BKF (2.5 g) were dissolved in cyclohexane (4 l). Renopal 450 (187.5 g), hydrophobized silica from Example 1a (460 g), and the whole of the aqueous suspension from Example 1b were stirred in. The solvent was steam-distilled at 80° C. by admitting steam at 100–110° C. for 3 h, then the solid product was separated as moist crumb, in which the silica was uniformly coated with rubber. The clear aqueous phase, which was discharged to waste, contained none of the silica. The mass of the dried product was 1221 g, corresponding to a yield of 99.3%.

Example 2: A styrene-butadiene rubber compound (control)

| Composition | phr |
|---|---|
| Buna VSL 5025-0 | 100 |
| Vulkanox BKF (phenolic antioxidant-Bayer AG) | 0.5 |
| Renopal 450 (mineral oil high in aromatics-Fuchs Mineralölwerke) | 37.5 |
| Vulkasil S (unmodified silica) | 92 |
| A polysulfane-silane compound on silica as in Example 1b | 16 |

Preparation

The rubber compound was prepared as in Example 1c but unmodified Vulkasil S—a highly active precipitated silica with a BET surface area of 180 m$^2$/g. made by Bayer AG—was substituted for the hydrophobized filler by treatment with castor oil. The result was that most of the silica was found in the aqueous phase, which was very cloudy, and the yield of crumb was only 930 g, corresponding to 75.6%.

Example 3: Vulcanized styrene-butadiene rubber compounds

|  | (a) Control | (b) Test |
|---|---|---|
|  | phr |  |
| Oil-extended rubber-silica compound as in Example 1c | — | 246.0 |
| Buna VSL 5025-0 (Bayer AG) | 100.0 | — |
| Vulkasil S (silica-Bayer AG) | 100.0 | — |
| S 69 (silane-Degussa AG) | 7.6 | — |
| Renopal 450 (mineral oil high in aromatics-Fuchs Mineralölwerke) | — | 37.5 |
| Zinc oxide | 2.5 | 2.5 |
| Stearic acid | 1.0 | 1.0 |
| Vulkanox HS (antioxidant-Bayer AG) | 1.0 | 1.0 |
| Vulkanox 4020 (antioxidant-Bayer AG) | 1.0 | 1.0 |
| Antilux ® 654 (antiozone wax-Rheinchemie) | 1.5 | 1.5 |
| Sulfur | 1.5 | 1.5 |
| Vulkacit ® CZ (accelerator-Bayer AG) | 1.8 | 1.8 |
| Vulkacit D (accelerator-Bayer AG) | 2.0 | 2.0 |
| Mooney scorch time, MS-t5/min at 130° C. | 15 | 31 |

(measured to DIN 53 523 with a Monsanto MDR 2000)

Rubber compounds of the compositions tabulated above (less the accelerators and sulfur) were homogenized for 5 min at 140° C. in an internal mixer, then accelerators and sulfur were incorporated on the two-roll mill at 50° C. The proportions stated are parts by mass. Finally, the compounds were vulcanized for 35 min at 170° C.

Mechanical properties of the two vulcanized compounds were as follows:

|  | (a) Control | (b) Test | Test method |
|---|---|---|---|
| Tensile tests, Specimen 2 |  |  | DIN 53 504 |
| Relative elongation at break/% | 284 | 280 |  |
| Tensile strength/MPa | 17.1 | 16.6 |  |
| Stress at 100% relative elongation/MPa | 5.0 | 4.7 |  |
| Rebound resilience/% |  |  | DIN 53 512 |
| at 23° C. | 14 | 15 |  |
| at 70° C. | 43 | 43 |  |
| Shore A hardness at 23° C. | 80 | 79 | DIN 53 505 |
| Abrasion/cm$^3$ | 150 | 121 | DIN 53 516 |

The results show clearly that the compound whose composition is in accordance with the present specification, (b), is markedly superior to the control with respect to processing behavior (the scorch tine is much longer), and in addition the abrasion resistance of the vulcanized compound is appreciably greater.

Example 4a: A polysulfidic-silane compound on silica

Sodium sulfide trihydrate (13.6 g, 104 mmol) and sulfur (10.0 g, 313 mmol S) were heated in water (160 ml) for 1 h at 70° C., yielding a clear solution. The temperature was increased to 85° C., and Vulkasil N (32 g)—a highly active silica with a BET surface area of 130 m$^2$/g, made by Bayer AG—, then (3-chloropropyl)triethoxysilane (12.5 g, 52 mmol), and bis(2-chloroethoxy)methane (13.5 g, 78 mmol) were stirred in. The mixture was kept at 85–95° C. for 10 h. The product was about 240 g of pale suspension containing 26 mmol of the polysulfidic-silane compound, i.e. 32 g of the polysulfane-silane compound on 32 g of silica. It was used without further treatment for the preparation of rubber compounds. After the suspended solid had been filtered off and dried at 105° C. it had a polysulfidic-silane compound to silica carrier mass ratio of 0.95.

*Methylenedioxydiethylenebis(tetrasulfanediyl)bis(propane-1,3-diyl)bis(triethoxysilane), $(C_2H_5O)_3Si\cdot[CH_2]_3\cdot[S]_4\cdot C_2H_4\cdot O\cdot CH_2\cdot O\cdot C_2H_4\cdot[S]_4\cdot[CH_2]_3\cdot Si(OC_2H_5)_3$.

Example 4b: Silica hydrophobized with oleyl(propyl)(trimethoxysilyl)-ammonium chloride and activated with the polysulfidic-silane compound from Example 4a An aqueous suspension of silica (mass fraction 20%) was prepared by mixing HiSil® 233 (348.65 g)—a highly active precipitated silica with a BET surface area of 130 m$^2$/g, made by PPG Industries, USA—with deionized water (1394.60 g) in a stirred vessel. The temperature of the mixture was to raised to 50° C., and oleyl(propyl)(trimethoxysilyl)ammonium chloride (1.85 g) and 2% sodium hydroxide solution (14.21 g) were stirred in within a period of 1 min. Then the suspension of polysulfidic-silane compound on silica as in Example 4a (222.49 g), containing 30.3 g of the polysulfidic-silane compound on 30.3 g of Vulkasil N, was added within a period of 30 min, and the mixture was stirred for another 30 min. Finally the temperature of the mixture was increased to 80° C., more oleyl (propyl)(tri-methoxysilyl)ammonium chloride (17.10 g) followed by 10% sodium hydroxide solution (13.26 g) were added within a period of 5 min, and the mixture was stirred for another 5 min.

In order to determine the methanol-wettability of the hydrophobized silica, a batch of suspension was prepared as described above without the addition of the suspension of polysulfidic-silane compound, and the silica was filtered off and dried at 105° C. The dry hydrophobized silica was wettable by methanol to the extent of 40% by mass.

Example 4c: A styrene-butadiene rubber compound

| Composition | phr |
|---|---|
| Buna VSL 5025-1 | 137.5 |
| Vulkanox 4020 (antioxidant-Bayer AG) | 0.5 |
| HiSil 233 (silica-PPG Industries) | 73.6 |
| Polysulfidic-silane compound on hydrophobized silica as in Example 1b | 12.8 |
| Oleyl(propyl)(trimethoxysilyl)ammonium chloride | 4.0 |

Preparation

Buna VSL 5025-1 (651.35 g)-oil-extended solvent-polymerized high-vinyl styrene-butadiene rubber made by Bayer AG—was dissolved in DHN 50 (1892.99 g), a $C_6$-alkane mixture produced by Exxon. The 2544.34 g of solution contained 473.71 g of polymer and 177.64 g of mineral oil high in aromatics. Vulkanox 4020 (2.37 g, equivalent to 0.5 phr)—antioxidant made by Bayer AG—was stirred in, followed by the aqueous suspension of polysulfidic-silane compound on hydrophobized silica, and the mixture was stirred for another 1 h. The product was a uniform suspension and a clear aqueous layer, which shows that all the silica, including the hydrophobized silica supporting the activator was to be found within the organic layer.

The solvent was steam-distilled after addition of deionized water (500 ml) to the mixture, which left rubber crumb 0.5–1 cm in size and only slightly cloudy water. The crumb was separated on a wire screen and dried at 70° C. in a vacuum drying oven. The water was filtered, and the residue dried and weighed. The mass of the residue was equivalent to 1.54% of all the silica employed, i.e. 98.46% was to be found in the rubber crumb.

Example 5: A polybutadiene rubber compound

| Composition | phr |
|---|---|
| Buna CB 24 | 100.0 |
| Renopal 450 (mineral oil high in aromatics-Fuchs Mineralölwerke) | 37.5 |
| Vulkanox 4020 (antioxidant-Bayer AG) | 0.5 |
| HiSil 233 (silica-PPG Industries) | 73.6 |
| Polysulfane-silane compound on hydrophobized silica as in Example 1b | 12.8 |
| Oleyl(propyl)(trimethoxysilyl)ammonium chloride | 4.0 |

Preparation

The same procedure was followed as in Example 4c, except that a solution of an oil-extended polybutadiene rubber was prepared first from the following:

| | |
|---|---|
| Buna CB 24 | 473.71 g |
| Renopal 450 (mineral oil high in aromatics-Fuchs Mineralölwerke) | 177.64 g |
| DHN 50 ($C_6$-alkane mixture-Exxon) | 1550.69 g |
| Vulkanox 4020 (antioxidant-Bayer AG) | 2.37 g |

After solvent had been removed, the compound was left in the form of 0.5-cm crumb containing more than 99% of the mass of the silica employed; the aqueous phase was only slightly cloudy. The moist crumb was dried at 70° C. in a vacuum drying oven.

Example 6: Vulcanized styrene-butadiene rubber compounds

| | (a) Control phr | (b) Test phr |
|---|---|---|
| Oil-extended rubber-silica compound as in Example 4c | — | 159.3 |
| Oil-extended rubber-silica compound as in Example 5 | — | 68.4 |
| Buna VSL 5025-1 (Bayer AG) | 96.3 | — |
| Buna CB 24 (Bayer AG) | 30.0 | — |
| Vulkasil S (silica-Bayer AG) | 80.0 | — |
| S 69 (silane-Degussa AG) | 6.4 | — |
| Enerthene ® 1849-1 (mineral oil high in aromatics-BP) | 9.0 | — |
| Zinc oxide | 3.0 | 3.0 |
| Stearic acid | 1.0 | 1.0 |
| Vulkanox HS (antioxidant-Bayer AG) | 1.0 | 1.0 |
| Vulkanox 4020 (antioxidant-Bayer AG) | 1.0 | 1.0 |
| Antilux 654 (antiozone wax-Rheinchemie) | 1.5 | 1.5 |
| Sulfur | 1.5 | 1.5 |
| Vulkacit CZ (accelerator-Bayer AG) | 1.8 | 1.8 |
| Vulkacit D (accelerator-Bayer AG) | 2.0 | 2.0 |
| Mooney viscosity ML 1 + 4 at 100° C. | 82 | 67 |

(measured to DIN 53 523 with a Monsanto MDR 2000)

Rubber compounds of the compositions tabulated above (less the accelerators and sulfur) were homogenized for 5 min at 140° C. in an internal mixer, then accelerators and sulfur were incorporated on the two-roll mill at 50° C. The proportions stated are parts by mass. Finally, the compounds were vulcanized for 15 min at 170° C.

Mechanical properties of the two vulcanized compounds were as follows:

| | (a) Control | (b) Test | Test method |
|---|---|---|---|
| Tensile tests, Specimen 2 | | | DIN 53 504 |
| Relative elongation at break/% | 380 | 405 | |
| Tensile strength/MPa | 19.1 | 18.3 | |
| Stress at 100% relative elongation/MPa | 3.4 | 3.0 | |
| Stress at 300% relative elongation/MPa | 13.9 | 13.0 | |
| Rebound resilience/% | | | DIN 53 512 |
| at 23° C. | 26 | 26 | |
| at 70° C. | 53 | 57 | |
| Shore A hardness at 23° C. | 73 | 68 | DIN 53 505 |
| Goodrich heat build-up/° C. | 15.8 | 14.7 | — |
| Abrasion/cm³ | 166 | 166 | DIN 53 516 |

The considerably smaller value of the mixing viscosity (ML 1+4) of the compound whose composition is in accordance with the present specification, (b) leads to much easier processing. In addition, the greater rebound resilience at 70° C. of the vulcanized compound compared with the control is advantageous, as is the reduced temperature increase in the material when it is subjected to dynamic strains (as measured by the Goodrich test), which experience shows to be associated with lower rolling resistance in tires.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber compounds comprising one or more soluble rubbers, 5 to 500 phr of hydrophobized filler having a methanol wettability of 1 to 60 weight percent, and 0.1 to 40 phr of one or more polysulfidic-silane compounds on an inorganic or organic support wherein said polysulfidic-silane compounds on an inorganic or organic support are those prepared by the reaction of (haloalkyl)silanes (I) and, if required, organic halogen compounds (II) with polysulfides (III) in water at temperatures in the range of 20–220° C. in the presence of an organic or inorganic support, the mole ratios of the components (I):(II):(III) depending on the number of bound halogen atoms in such a way that there are from 1.5 to 3 halogen atoms to every molecule of polysulfide, and the mass ratio of the polysulfidic-silane compound to support being from 0.1 to 10.

2. Rubber compounds according to claim 1 in which said soluble rubber is selected from the group consisting of a polybutadiene, styrene-butadiene copolymer, isobutene-isoprene copolymer, ethylene-propene-diene copolymer, polyisoprene, or natural rubber.

3. Rubber compounds according to claim 1 in which said hydrophobized filler is hydrophobized oxide or silicate fillers or mixtures of the two.

4. Rubber compounds according to claim 1 in which said filler is not wetted by water when they are in the dry state at room temperature but is wetted by a water/methanol mixture containing from 1 wt % to 60 wt % methanol.

5. Rubber compounds according to claim 3 in which said oxide or silicate fillers or mixtures of the two have been hydrophobized in water.

6. Rubber compounds according to claim 3 in which said oxide or silicate fillers or mixtures of the two have been hydrophobized while in the dry state.

7. Rubber compounds according to claim 1 where the formulae said (haloalkyl)silanes (I), organic halogen compounds (II), and polysulfides (III) correspond to the following $$R^1R^2R^3Si.XHal_n \quad (I)$$

$$YHal_m \quad (II)$$

$$Me_2S_x \quad (III),$$

where:
  $R^1$, $R^2$, and $R^3$ are identical or different substituents, and may be chlorine atoms, alkyl or alkoxy groups having from 1 to 18 carbon atoms, some of which may be replaced by oxygen, nitrogen, or sulfur atoms, aryl or aryloxy groups having from 6 to 12 carbon atoms, or alkylaryl or alkylaryloxy groups having from 7 to 18 carbon atoms, provided that at least one of the substituents $R^1$, $R^2$, and $R^3$ is chlorine, an alkoxy group, aryloxy, or an alkylaryloxy group;
  X represents linear, branched or cyclic, optionally unsaturated $C_1$–$C_{18}$-alkylene groups, which may optionally be interrupted by oxygen atoms, and wherein one to three hydrogen atoms might be substituted by halogen atoms,
  Y is either a monovalent, bivalent, or trivalent heteroatom or a linear or branched, saturated or unsaturated aliphatic hydrocarbon substituent group, or an aromatic one, having from 1 to 4 free valencies and from 1 to 36 carbon atoms, which may be replaced by one or more oxygen, nitrogen, or sulfur atoms or be substituted with aryl ($C_6$–$C_{12}$), alkoxy ($C_1$–$C_{12}$), R-oxycarbonyl ($C_1$–$C_{22}$), R-carbonyloxy ($C_1$–$C_{22}$), hydroxy, cyano, amino, carboxyl, sulfo, carboxylato, or sulfonato groups;
  m is an integer whose value is from 1 to 4;
  n is an integer whose value is from 1 to 3:
  x is an integer whose value is from 1 to 8;
  Hal is fluorine, chlorine, or bromine; and
  Me is ammonium or a metal cation.

8. A process for the preparation of rubber compounds comprising one or more soluble rubbers, 5 to 500 phr of hydrophobized filler having a methanol wettability of 1 to 60 weight percent, and 0.1 to 40 phr of one or more polysulfidic-silane compounds on an inorganic or organic support in which said polysulfidic-silane compounds on said inorganic or organic support is mixed with a rubber solution and said hydrophobized filler and water and solvent are removed at a temperature in the range of 50–250° C. wherein said polysulfidic-silane compounds on an inorganic or organic support are those prepared by the reaction of (haloalkyl)silanes (I) and, if required, organic halogen compounds (II) with polysulfides (III) in water at temperatures in the range of 20–220° C. in the presence of an organic or inorganic support, the mole ratios of the components (I):(II):(III) depending on the number of bound halogen atoms in such a way that there are from 1.5 to 3 halogen atoms to every molecule of polysulfide, and the mass ratio of the polysulfidic-silane compound to support being from 0.1 to 10.

9. A process according to claim 8 in which said rubber solution contains further fillers or auxiliaries to assist processing or stabilization.

10. A process according to claim 8 in which said solvent is removed by steam distillation.

11. A molded product comprising rubber compounds comprising one or more soluble rubbers, 5 to 500 phr of hydrophobized filler having a methanol wettability of 1 to 60 weight percent, and 0.1 to 40 phr of one or more polysulfidic-silane compounds on an inorganic or organic support wherein said polysulfidic-silane compounds on an inorganic or organic support are those prepared by the reaction of (haloalkyl)silanes (I) and, if required, organic halogen compounds (II) with polysulfides (III) in water at temperatures in the range of 20–220° C. in the presence of an organic or inorganic support, the mole ratios of the components (I):(II):(III) depending on the number of bound halogen atoms in such a way that there are from 1.5 to 3 halogen atoms to every molecule of polysulfide, and the mass ratio of the polysulfidic-silane compound to support being from 0.1 to 10.

12. A molded product according to claim 11, wherein said soluble rubber is selected from the group consisting of a polybutadiene, styrene-butadiene copolymer, isobutene-isoprene copolymer, ethylene-propene-diene copolymer, polyisoprene, or natural rubber.

13. A molded product according to claim 11, in which said hydrophobized filler is hydrophobized oxide or silicate fillers or mixtures of the two.

14. A molded product according to claim 11, in which said filler is not wetted by water when they are in the dry state at room temperature but is wetted by a water/methanol mixture containing from 1 wt % to 60 wt % methonal.

15. A molded product according to claim 14 in which said oxide or silicate fillers or mixtures of the two have been hydrophobized in water.

16. A molded product according to claim 13 in which said oxide or silicate fillers or mixtures of the two have been hydrophobized while in the dry state.

17. A molded product according to claim 11 wherein said molded product is a tire.

18. A molded product according to claim 11 wherein said molded product is a tire tread.

* * * * *